Jan. 13, 1959 J. W. THOMAS 2,868,357
VIBRATING MEANS FOR MATERIAL CONVEYOR
Filed Feb. 7, 1956 3 Sheets-Sheet 1

INVENTOR.
John W. Thomas
BY
Hyde, Meyer, Baldwin & Doran
Attorneys

Jan. 13, 1959 J. W. THOMAS 2,868,357
VIBRATING MEANS FOR MATERIAL CONVEYOR
Filed Feb. 7, 1956 3 Sheets-Sheet 2

INVENTOR.
John W. Thomas
BY
Hyde, Meyer, Baldwin & Doran
Attorneys

Jan. 13, 1959  J. W. THOMAS  2,868,357
VIBRATING MEANS FOR MATERIAL CONVEYOR
Filed Feb. 7, 1956  3 Sheets-Sheet 3

INVENTOR.
John W. Thomas
BY
Hyde, Meyer, Baldwin & Doran
Attorneys

United States Patent Office 2,868,357
Patented Jan. 13, 1959

2,868,357
VIBRATING MEANS FOR MATERIAL CONVEYOR

John W. Thomas, Mayfield Heights, Ohio, assignor to The Cleveland Vibrator Co., Cleveland, Ohio, a corporation of Ohio Application February 7, 1956, Serial No. 563,898

3 Claims. (Cl. 198—220)

This invention relates to novel and improved means for moving material particularly broken-up material of lump, granular or comminuted character. It relates more especially to a spring mounting for a conveyor, including a vibrator associated therewith, in such way as to be simpler, more efficient and more economical than heretofore available in the trade.

An object of the invention is to provide vibrator means for a conveyor, so mounted and applied to the conveyor as to enhance the vibratory action of the vibrator and consequently facilitate and expedite the movement of material in the conveyor. In this specification and the appended claims the term "material" is used to denote the entity moved on the conveyor, and includes lump material such as crushed stones, slag, coal coke, or the like and finer comminuted material such as sand, gravel, or any sort of powder. The examples given are merely illustrative, and are not intended to be limiting.

In the drawings illustrating several embodiments of the invention,

Fig. 1 is a view, partly in vertical section and partly in side elevation, taken axially through a tubular conveyor and feed hopper equipped with a novel vibrator mounting embodying my invention.

Figs. 2 and 3 are sectional views taken respectively on the lines 2—2 and 3—3 of Fig. 1.

Before the present invention is described in detail, it is to be understood that the invention here involved is not limited to the details or exact arrangement herein illustrated and described, as the invention obviously may take other forms. It also is to be understood that the phraseology or terminology herein employed is for the purpose of description and not of limitation, the scope of the present invention being denoted by the appended claims.

Figure 1:
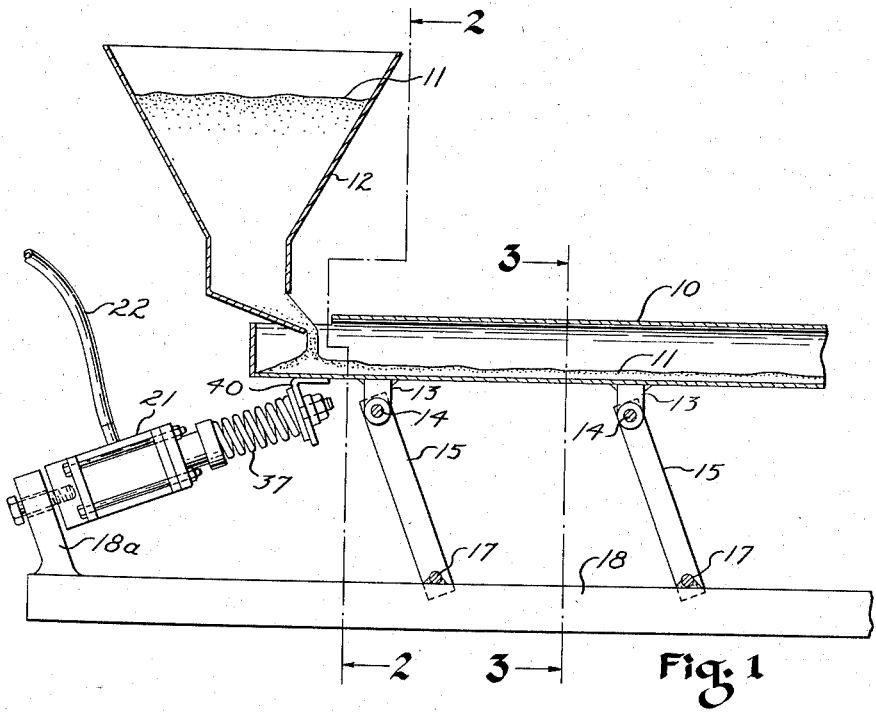
Figure 2:
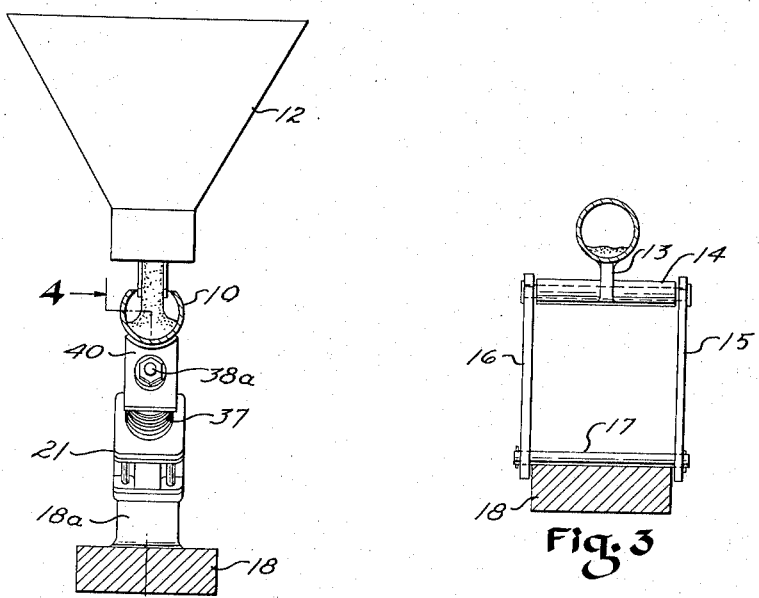
Figure 3:
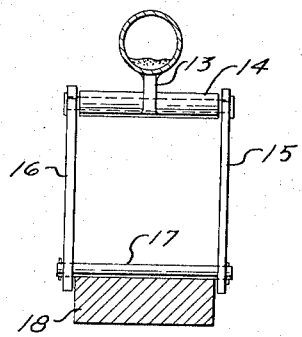

Speaking first generally, with reference for the moment to Fig. 1, I show a tubular conveyor 10 to which granular material 11 is introduced from a hopper 12. The conveyor is carried on bracket supports 13 fixed on cross shafts 14 (Fig. 3) which in turn are pivotally retained in bored apertures in the upper ends of respective rocker arms or links 15 on the right side and 16 on the left side, looking from the loading end, namely the left end in Fig. 1. At their lower ends the rocker arms are pivotally carried on shafts 17 attached to the base 18. Other means of support may be provided as long as such means permits a limited back-and-forth rocking movement of the conveyor on the base, and, as will be apparent to those skilled in the art, the shafts, bearings, etc., may be modified both as to their structure and manner of mutual connection and cooperation as long as the conveyor can move as aforesaid, and as hereinafter described.

For suitable agitation of the conveyor, I have provided a vibrator 21 powered preferably by compressed air through a pipe 22 from an air source, not shown. The vibrator, however, may be energized electrically or in any other suitable way as long as it develops a rapid reciprocatory movement axially of the vibrator housing.

Figure 4:
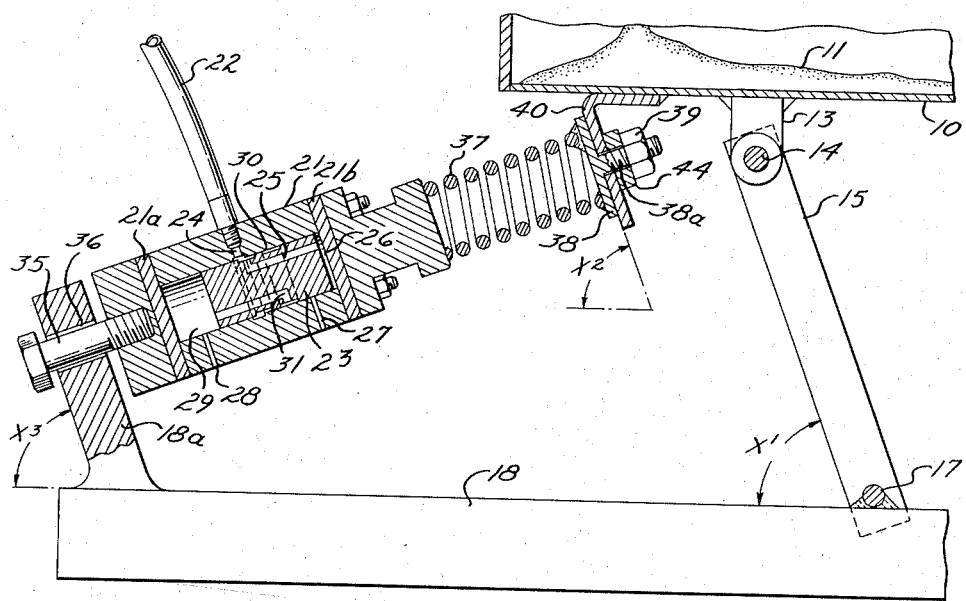
Fig. 4 is a vertical sectional view, somewhat enlarged, showing details of the vibrator and mounting means.

Referring to Fig. 4, the vibrator 21 is bored out to accommodate a piston 23 movable endwise between inner cylinder heads 21a and 21b. Fluid power enters through port 24 and, in the position of the parts as shown in Fig. 4, the fluid passes through the bored aperture 25 into the chamber 26, causing the piston to be thrown towards head 21a. After a fractional increment of travel, the piston uncovers an exhaust port 27 and at the same time covers another exhaust port 28 from chamber 29 whereupon trapped air begins to be compressed in chamber 29, slowing down and stopping the piston. Also about the time exhaust port 28 is covered, the piston has moved enough so that the fluid power from port 24 is now flowing through the annular groove 30 into piston passage 31 and into chamber 29, which causes the piston to reverse its movement and to arrive again at the position shown, thereby completing one cycle. The process of course proceeds with extreme rapidity and the endwise reciprocatory displacement of piston 23 produces the vibrating effect desired. The structure and operation so far described is familiar to those skilled in the art.

At its lower end the vibrator is supported on a lug 18a fixed to the base 18, the vibrator end having a threaded aperture which receives a stud bolt 35, the shank of which passes with oversize clearance through an aperture 36 in lug 18a. As will be noted in Fig. 4 there is more than sufficient clearance between the stud shank of bolt 35 and the lug 18a to permit unrestrained longitudinal play of the bolt as the vibrator operates.

Attached to the upper end of the vibrator is a strong helical spring 37, the other end of the spring being fixed to a cap 38 which has a stub shaft 38a threaded on its tip to receive a weight 44 and a connecting nut 39 by means of which the cap, weight, and shaft assembly is firmly secured to an angular bracket 40 fixed to the bottom of the conveyor 10. The weight 44 may be varied to change the natural frequency of vibration of the system, as hereinafter explained.

Figure 5:
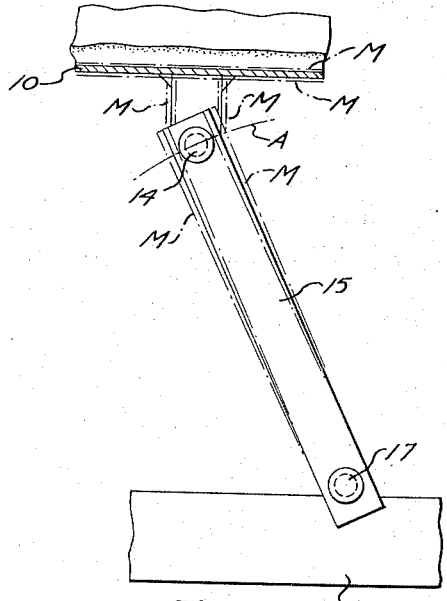
Fig. 5 is a detail view indicating, by full and broken lines, the movement of the conveyor and its supporting link responsive to operation of the vibrator.

It may be observed that the angularities of the lug 18a and the bracket 40, as well as their relative positions, are such that the longitudinal axes of the vibrator and spring are in lineal alignment, and at an angle to the conveyor and to the base. The links 15 and 16 act as hinges and their purpose is primarily to restrain conveyor movement. Although the rocker arm shafts 14 move in the direction of arc A, Fig. 5, the movement is limited to the short angular displacement indicated by the broken lines of movement M in the same figure, and the direction of movement is essentially parallel to the longitudinal axis of spring 37. More specifically, the tangent of the arc A is parallel to the axis of spring 37 when the angle $X_1$ is equal to the angles $X_2$ and $X_3$ (Fig. 4).

The angle of the common axis of the spring and vibrator should be between about ten degrees and forty-five degrees to the conveyor floor, and the movement imparted to the tray will be back and forth along a line which is at the same angle to the conveyor floor when the angles $X_1$ and $X_2$ are equal. When the reciprocatory motion is rapid enough it causes the bulk material to be conveyed along the tray in a manner which visually appears to be the flow of a fluid.

I have discovered that the highest rate of flow is achieved when the spring system is tuned to near its natural frequency. While the spring itself has a natural frequency, it should be emphasized here that I am speaking not of this natural frequency of the spring, but I refer specifically to the natural frequency of the spring system. This term includes also the weight supported on the spring, and the acceleration of gravity is likewise a factor. By adjusting, in conjunction with the vibrator frequency, the value of the weight of the container and its contents supported on the spring end and/or of the weight of the rocker arms the unit can be operated as desired at or near the natural frequency of the system. Actually the forced vibration, or the frequency of the vibrator under load, should be close to the natural frequency of the system, which is normally considerably less than the natural frequency of the spring alone.

The floating connection between stud 35 and lug 18a permits a rate of flow which is higher than if a rigid connection were used at the same point.

There are accordingly several factors which control the flow of material, among which are:

(a) Variation of weight of conveyor, rocker arms, and contents.

(b) Variation of fluid power pressure thus affecting the frequency and intensity of the variations.

(c) Variation in size of the hopper opening so as to control quantitatively the amount of material delivered.

One advantage of operating at the natural frequency of the system instead of the natural frequency of the spring is that when the spring is operating near its own individual natural frequency, it is much more susceptible to fatigue failure. The force of the vibration at the natural frequency of the system in the present instance has been determined by tests to be considerably less than that of the natural frequency of the spring.

Figure 6:
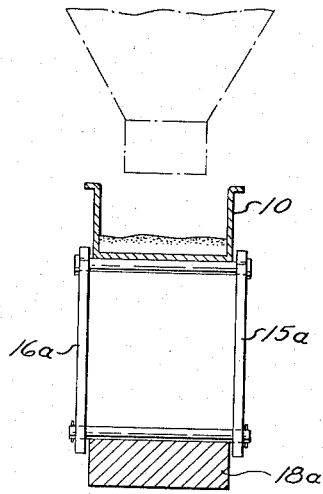
Fig. 6 is a view, in transverse section, of a modified conveyor.

Fig. 6 is a sectional view of an embodiment in which an open tray 43 is substituted for the tubular conveyor 10 of the earlier figures. The tray is supported on the rocker arms 15a, 16a which are mounted on the base 18a in all respects similar to the mounting of the tubular conveyor 10 of the earlier embodiment.

Figure 7:
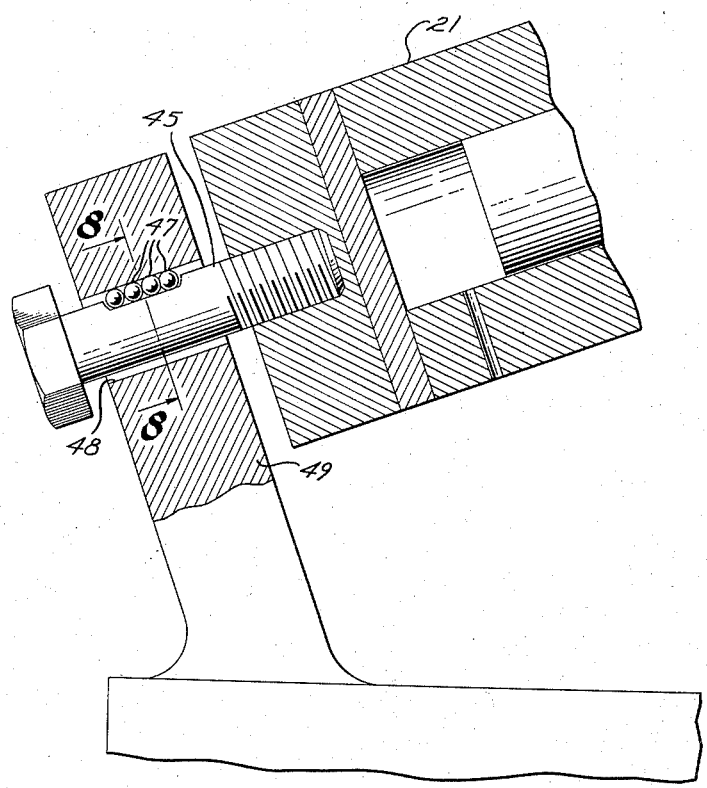
Fig. 7 is a fragmentary detail view, in vertical section and somewhat enlarged, showing another modification of base mounting for the vibrator.
Figure 8:
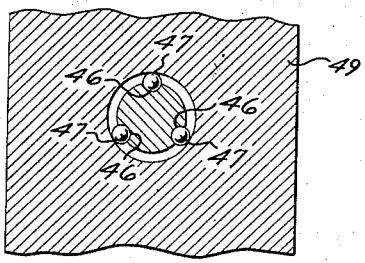
Fig. 8 is a sectional view taken on the line 8—8 of Fig. 7.

Figs. 7 and 8 show sectional views in which the shank 45 of the stud is provided with three peripherally spaced longitudinal slots 46 to receive balls 47, and the assembly serves as a ball bearing for the shank within the aperture 48 of base lug 49. The axial travel of the stud is limited longitudinally so that the balls 47 are trapped in the slot. By reducing friction at this floating joint, the flow of material is expedited. Other types of rolling surface contact could be devised, in substitution for the one shown in Figs. 7 and 8, and in the appended claims this general type of low friction bearing will sometimes be termed an anti-friction bearing following the usual term in the mechanical arts.

What I claim is:

1. Apparatus for moving material comprising, in combination, a conveyor furnishing a path for the advance of material therein, a fixed base, a plurality of rocker arms supporting said conveyor above said base, each said rocker arm being pivotally connected at its upper end to said conveyor and at its lower end to said base, a vibrator connected at its lower end to said base, a helical spring fixed at its lower end to the upper end of said vibrator and at its upper end to said conveyor, the natural frequency of the spring system, including the component of conveyor weight supported thereon, being approximately equal to the operating frequency of the vibrator, the vibrator having an element reciprocating lineally along a continuation of the helical spring axis, and the connection between the lower end of said conveyor and said base including an antifriction bearing disposed to permit limited movement of said conveyor with respect to said base along said spring axis.

2. Apparatus as defined in claim 1 wherein the lower end of said vibrator is provided with a shaft extending lineally coaxially with an extension of said spring axis, and said base has an antifriction bearing attached thereto to receive said shaft.

3. Apparatus as defined in claim 2 wherein said antifriction bearing is a roller bearing.

References Cited in the file of this patent

UNITED STATES PATENTS

| | | |
|---|---|---|
| 1,810,882 | Heymann et al. | June 16, 1931 |
| 2,251,586 | Flint | Aug. 5, 1941 |
| 2,337,174 | Bebinger | Dec. 21, 1943 |

FOREIGN PATENTS

| | | |
|---|---|---|
| 14,062 | Great Britain | July 20, 1893 |
| 168,160 | Great Britain | Sept. 1, 1921 |
| 485,982 | Germany | Nov. 7, 1929 |